United States Patent [19]

Airheart

[11] 4,120,386
[45] Oct. 17, 1978

[54] MULTIPLE PIECE BRAKING DISC ASSEMBLY

[75] Inventor: Franklin B. Airheart, Sylmar, Calif.

[73] Assignee: Airheart Products, Inc., Chatsworth, Calif.

[21] Appl. No.: 794,469

[22] Filed: May 6, 1977

[51] Int. Cl.² .............................................. F16D 65/12
[52] U.S. Cl. ........................... 188/218 XL; 192/70.13; 192/107 R
[58] Field of Search ....................... 188/218 XL, 73.2; 192/70.13, 107 R; 403/344

[56] References Cited

FOREIGN PATENT DOCUMENTS 1,605,238 8/1971 Fed. Rep. of Germany .... 188/218 XL
2,301,246 7/1974 Fed. Rep. of Germany .... 188/218 XL
976,463 9/1963 Fed. Rep. of Germany .......... 403/344

Primary Examiner—George E. A. Halvosa
Attorney, Agent, or Firm—William W. Haefliger

[57] ABSTRACT

A braking disc is split into two arc-shaped body sections each having opposite faces for engagement with brake pads; an elongated fastener and a guide pin are located in the space between such faces for releasably guiding and retaining the sections in assembled relation, and thickened ribs and associated bosses with sub-ribs thereon provide parallel bores to receive the fastener and pin, enabling quick disassembly of the sections.

1 Claim, 4 Drawing Figures

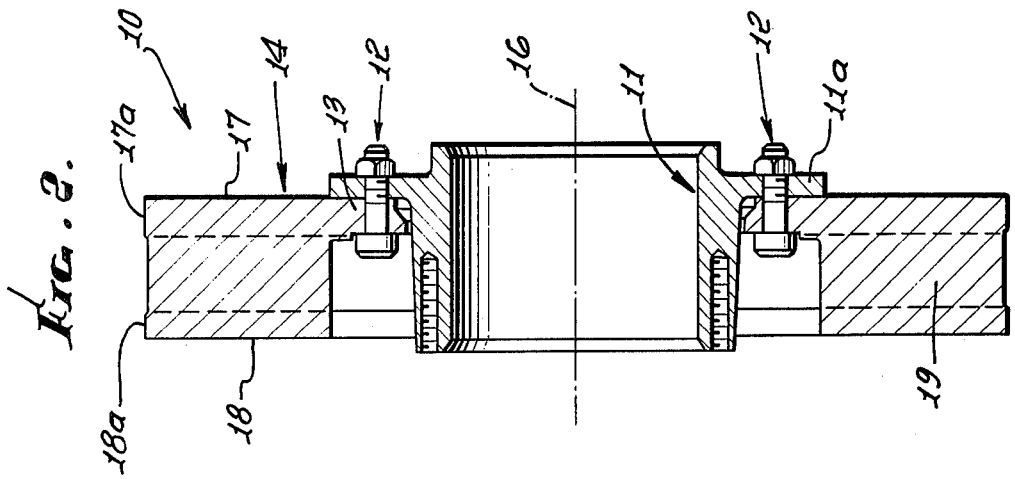
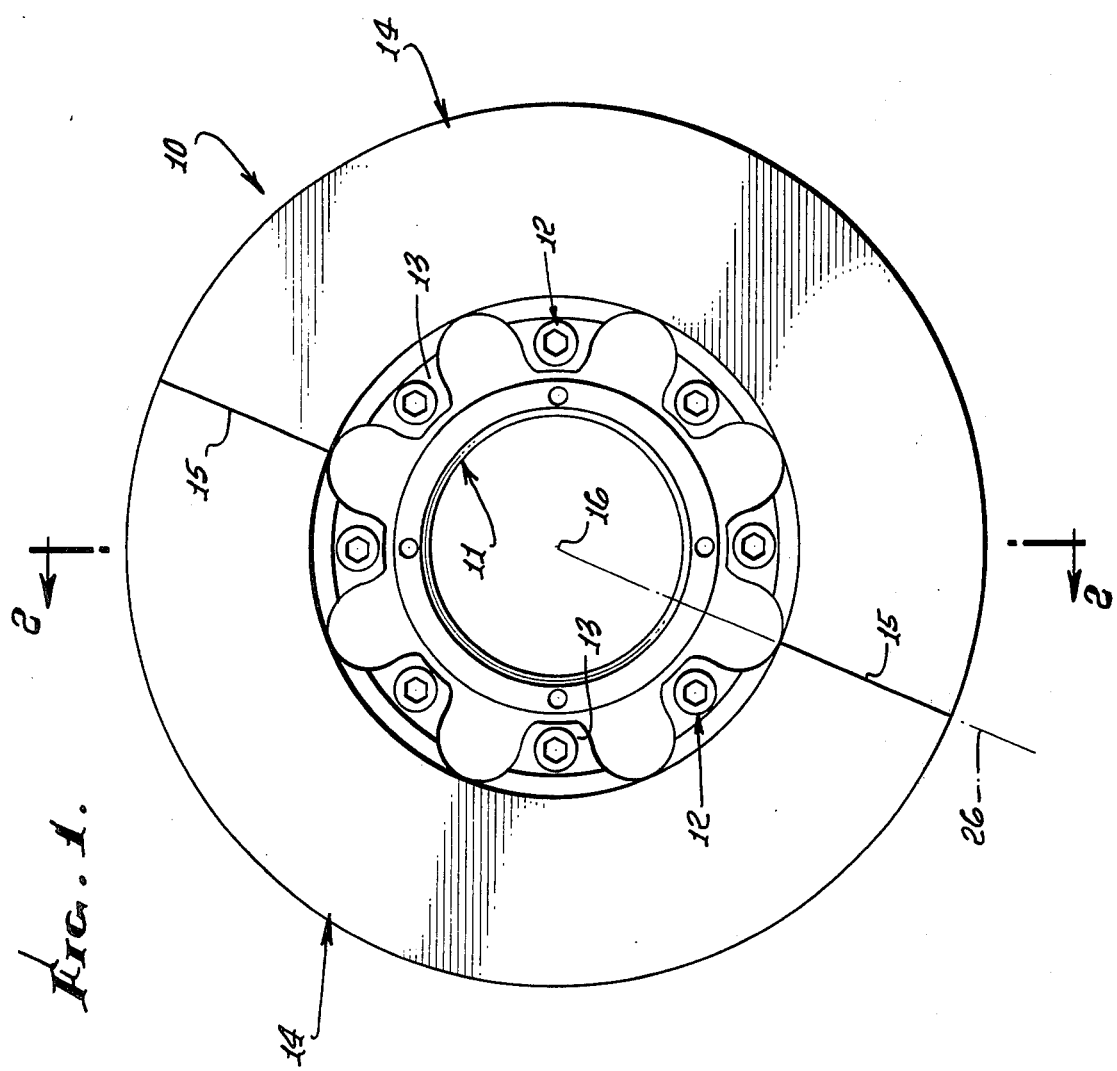

MULTIPLE PIECE BRAKING DISC ASSEMBLY

BACKGROUND OF THE INVENTION

This invention relates generally to disc brakes, and more particularly concerns split disc structure enabling quick removal and replacement of discs.

Conventionally, vehicle braking discs are located at the inner sides of vehicle wheels, whereby to gain access to such discs it is necessary to remove the wheels. In the case of rapid transit or railroad type installations, it is necessary to remove a wheel truck off of the transit car, then remove an axle, propulsion gear and press the wheel off the axle in order to gain access to a single piece disc for its removal and replacement. All of the equipment must then be reassembled. Also, each time a wheel is pressed off an axle, it cannot be re-used on that axle due to loss of interference fit. It is readily seen that serious problems of down time and expense are involved in replacing worn or damaged discs.

SUMMARY OF THE INVENTION

It is a major object of the invention to provide a new type braking disc which avoids or overcomes the above problems. Basically, the invention concerns the provision of a disc split into at least two arc-shaped body sections each having opposite faces for engagement with brake pads; and retention means located in the space between such opposite faces for releasably retaining the sections in assembled relation to form an integrated circular or annular disc with its opposite faces maintained in two parallel planes; further, the assembly typically includes retaining means for attaching them to rotating structure such as a hub on an axle, whereby when the retention means is released, the sections may be easily separated and removed off the hub structure, and away from a first axis defined by the hub, followed by replacement with new disc sections.

As will appear, the sections typically include heat transfer ribs extending between plates which form the brake shoe engaging faces, and the retention means comprises an elongated fastener extending between the sections and defining a second axis perpendicular to a radius from the first axis. The fastener is enabled to be located close to the peripheries of the disc section, for ease of removal, and at the same time bosses on the sections that receive the fastener provide high strength as well as cooling effect, there being cooling ribs associated with said bosses. The retainer means also include a guide pin spaced radially inwardly of the fastener, and extending parallel thereto, for reception in bores defined by the section; thus, the pin guides the sections into alignment to enable insertion of the longer fastener, as will be seen. The resultant structure has high strength, provides accurate alignment of the disc section, facilitates rapid disassembly of the section for replacement, and is extremely simple.

This invention constitutes an unusually advantageous improvement over that disclosure in U.S. Pat. No. 4,004,661.

These and other objects and advantages of the invention, as well as the details of illustrative embodiments, will be more fully understood from the following description and drawings, in which:

DRAWING DESCRIPTION

FIG. 1 is a side elevation showing a brake disc assembly embodying the invention;

FIG. 2 is a section taken on lines 2—2 of FIG. 1;

DETAILED DESCRIPTION

Figure 3:
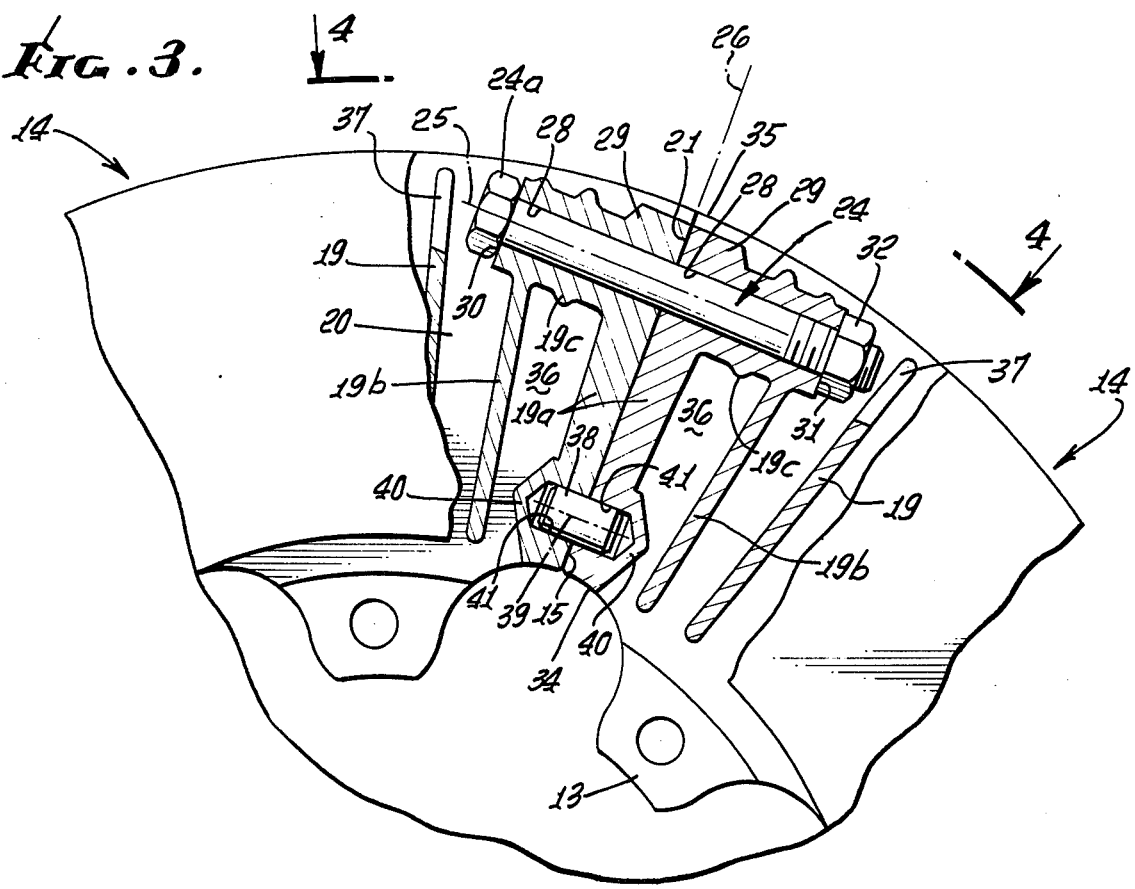
FIG. 3 is an enlarged fragmentary elevation, partly broken away to show retention of disc body sections.
Figure 4:
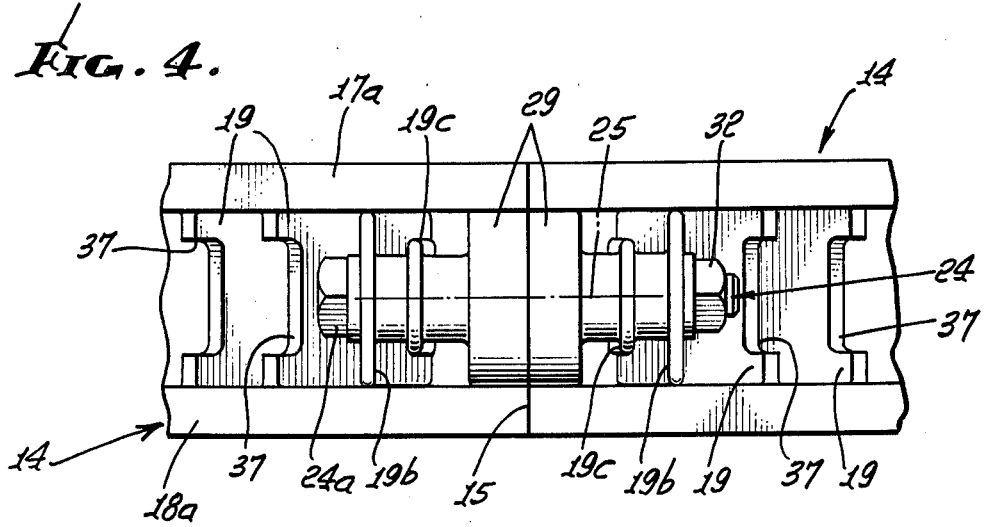
FIG. 4 is a view on lines 4—4 of FIG. 3.

As referred to, the braking disc assembly, an example of which is indicated at 10 in FIGS. 1 and 2 is attachable to rotating structure such as the vehicle hub 11. In the example, bolts 12 join tabs 13 on two like disc body sections 14 to a flange 11a on hub, the tabs 13 serving as connecting means for the sections.

The two sections 14 are arc-shaped, and preferably semi-circular so that joints 15 therebetween are diametrically opposed with respect to first axis 16. The disc body sections have opposite faces at 17 and 18 for engagement with brake pads, such faces typically being formed by metallic plates 17a and 18a which are interconnected as by metallic cooling ribs 19 which extend generally radially and are circularly spaced apart. Plates 17a and 18a are parallel and spaced apart, axially.

In accordance with the invention, retention means is provided between the opposite faces 17 and 18, and preferably in the space 20 between plates 17a and 18a for releasably retaining the sections 14 in assembled relation. The construction is such that sections are joined to form a circular disc with the faces 17 and 18 of the sections maintained in two parallel planes. In this regard, the sections have adjacent terminals at both joints 15, such terminals indicated at 21 in FIG. 3; further, the retention means preferably bridges each joint and has releasable connection with certain ribs such as are indicated at 19a as being proximate the joint 15.

The retention means typically comprises an elongated fastener, as for example at 24, extending between the sections 14 and defining a second axis 25 extending parallel to the planes of faces 17 and 18; also axis 25 extends generally perpendicular to a radius 26 from axis 16. In this regard, the sections 14 typically define like guide bores 28 receiving the fastener shank, such bores extending through bosses 29 extending oppositely from joint 21 in the direction of axis 25. The ends 30 and 31 of the bosses are flattened to seat the fastener head 24a and a nut 32 is provided on the threaded end of the fastener. The ends of the bosses closest to the joint 21 are respectively integral with like thickened ribs 19a which abut one another at the joint. Ribs 19a extend radially inwardly, and are confined between the plates 17a and 18a and between the radially inner and outer peripheries 34 and 35 of such plates. Ribs 19a and bosses 29, when assembled, form a T-shaped structure in planes perpendicular to axis 16.

Additional ribs 19b are circumferentially spaced at 36 from thickened ribs 19a, and are connected to the portions of the bosses furthest from joint 21, for added strength. The space 36 has an open dimension substantially free of ribbing between bosses 29 and 40 measured in a direction parallel to the second axis 25 which is everywhere greater than the width of either rib 19a as shown in FIG. 3. As further shown in FIG. 3, those portions of bosses 40 and ribs 19b closest to the first axis 16 are at substantially the same radial distance from the first axis. Note sub-ribs 19c on the bosses. Accordingly, a high strength connection, with high cooling or heat transfer capacity is provided; also the structure enables accurate interconnection of the sections 14 so that plate surfaces 17 on the sections, are co-planar, as well as surfaces 18 being likewise co-planer. Note that ribs 19 spaced from the bosses are only peripherally cut-away at 37 to enable axial reception of the fastener into the bores 28, upon interconnection of the sections 14, whereby maximum cooling or heat transfer effect is not disrupted.

For additional strength and accuracy of section alignment, the retention means includes a guide pin, as for example at 38, extending between the sections 14. Pin 38 defines a third axis 39 extending parallel to the planes defined by sides 17 and 18 and in a direction generally perpendicular to radius 26; thus, axis 39 is preferably parallel to axis 25, and the pin is spaced radially inwardly of the fastener to be closer to axis 16 than axis 25. The sections 14, and particularly the enlargements or locally thickened bosses 40 on the ribs 19a, define guide bores 41 closely receiving the opposite ends of the pin. The short length of the pin, i.e. less than 1/3 the length of the fastener, facilitates its reception into the bores 41 upon assembly of the two sections 14, whereby the long bores 28 are thereupon accurately aligned for ease of reception of the long fastener 24.

When it is required to replace a worn or damaged brack disc, it is only necessary to remove the one fastener 24. It is then possible to separate the two disc sections 14 in opposite directions parallel to axes 25 and 39, whereby the sections 14 are removed and can be replaced without removal of a wheel, axle or propulsion gear associated with hub 11.

I claim:
1. A braking disc assembly connectable to rotating structure, comprising
 (a) multiple arc-shaped disc body sections having opposite faces for engagement with brake pads, said faces having radially spaced inner and outer edges,
 (b) and retention means between said opposite faces for releasably retaining said sections in assembled relation to form an integrated disc with said faces maintained in two spaced parallel planes, said sections defining a first axis,
 (c) said retention means including an elongated fastener extending between said sections defining a second axis extending parallel to said planes and in a direction generally perpendicular to a radius from said first axis,
 (d) said retention means also including a guide pin extending between said sections and defining a third axis extending parallel to said planes and in direction generally perpendicular to said radius, said fastener and pin being spaced apart in the direction of said radius, the pin closer to the first axis than the fastener,
 (e) said retention means including abutting ribs on the sections which are locally thickened and form first protruding bosses containing through bores receiving the fastener, said bores located proximate a circle defined by the radially outermost peripheries of the sections, said ribs also being locally thickened to form second bosses containing second bores receiving the guide pin, said second bosses located adjacent said face inner edges which are arcuate, said second bores being closed at the opposite ends of the pin and having equal diameters, whereby the pin is completely enclosed by the abutting ribs and second bosses, said second bosses projecting from said abutting ribs and in opposite directions parallel to said third axis,
 (f) said sections including parallel plates defining said opposite faces and defining a space therebetween, and ribs integral with the plates, certain of said ribs extending radially outwardly of said first bosses, the second bosses protruding into open proximity to others of said ribs which project radially inwardly from opposite end portions of the first bosses,
 (g) said abutting ribs being everywhere substantially thicker than said other ribs, the fastener being several times longer than the pin, and the overall width of each first boss at locations between the thickened rib and the other rib and in radial directions being about the same as the combined widths, in a direction parallel to said second axis, of said abutting ribs at locations between the first and second bosses, each of said thickened ribs merging with one of said first bosses and one of said second bosses,
 (h) there being only one open space between each of said second bosses and one of said first bosses, said space having an open dimension substantially free of ribbing between one of said other ribs and one of said thickened ribs, said dimension being measured in a direction parallel to said second axis, and being everywhere greater than the width of either of said thickened ribs, those portions of said second bosses and of said other ribs closest to said bosses which are closest to said first axis being at substantially the same radial distance from said first axis.

* * * * *